United States Patent [19]

Fleischer

[11] 3,750,189

[45] July 31, 1973

[54] LIGHT SCANNING AND PRINTING SYSTEM

[75] Inventor: John M. Fleischer, San Jose, Calif.

[73] Assignee: International Business Machines, Armonk, N.Y.

[22] Filed: Oct. 18, 1971

[21] Appl. No.: 190,024

[52] U.S. Cl. .................................. 346/74 ES, 350/7
[51] Int. Cl. ...................... G02b 17/00, G01d 15/12
[58] Field of Search .............. 340/173 LM, 173 LT; 346/74 ES, 74 P; 350/7; 355/7; 178/7, 6

[56] References Cited
UNITED STATES PATENTS

| | | | |
|---|---|---|---|
| 2,692,370 | 10/1954 | Moore, Jr. | 324/97 |
| 3,626,386 | 12/1971 | Feinleib | 340/173 LT |
| 3,638,029 | 1/1972 | Hartmann | 340/173 LT |
| 3,469,030 | 9/1969 | Priebe | 178/6.7 |
| 3,638,231 | 1/1972 | Poole et al. | 346/74 ES |
| 3,475,760 | 10/1969 | Carlson | 346/74 TP |

Primary Examiner—Vincent P. Canney
Attorney—Melvyn D. Silver et al.

[57] ABSTRACT

A light scanning system of controlled spot motion variation perpendicular to the direction of scan utilizing a rotating mirror and two cylindrical or toroidal lenses positioned relative to the rotating mirror to allow increased nominal axis of rotation to facet angular tolerances while maintaining a distinct non-overlapping line scan. Specifically, for one application the axis of rotation of the mirror is orthogonal to the plane formed by the incoming and reflected beam from the mirror. The first cylindrical or toroidal lens, which has little or no power in the scan plane, focuses the incoming beam in the azimuth perpendicular to the scan onto the mirror while the second cylindrical lens acts as a beam configurer to configure the beam to substantially collimated shape while directing it towards a spherical lens for focusing onto an image plane.

21 Claims, 4 Drawing Figures

INVENTOR.
JOHN M. FLEISCHER

BY Melvyn David Silver
ATTORNEY

LIGHT SCANNING AND PRINTING SYSTEM

FIELD OF THE INVENTION

Optical light scanning devices in general and light scan-ning devices in particular utilizing a rotating assembly such as a rotating mirror for deflecting the scanning beam.

PRIOR ART

Optical scanning systems are used for a variety of well known functions, such as optical printing, oscillograph tracing, television line generation, or more broadly line display systems in general. Rotating mirrors are often used in such systems. Examples of such mirror systems include that shown in U. S. Pat. Nos. 2,692,370 which utilizes a galvanometer type mirror; the well known Scophony television receiver, as shown in "Television" by V. K. Zworykin, Second Edition, Wiley & Sons New York, 1940, 1954; page 277, which utilizes rotating mirrors; 2,976,361 which utilizes a warped mirror; and 3,345,120 which utilizes a rotating disk type mirror.

An object of such scanning systems is to be able to scan across a given field while maintaining minimum spot motion in the direction perpendicular to the scan direction with distinct parallel line separation for successive facets of the rotating mirror. Attempts at spot motion control take different forms. U. S. Pat. No. 2,692,370, for example, is illustrative of scanning systems using a set of cylindrical lenses and a rotating mirror. The cylindrical lenses are aligned perpendicular to each other and neither lens focuses the beam on the surface of the rotating mirror. Spot motion is controlled from successive facets where desired by the accuracy of the mirror used.

Rotating mirrors as also utilized as in the Scophony system achieve the desired quality of line scanning by use of highly accurately faceted mirrors. Highly accurate rotating mirrors for highly accurate spot motion control are expensive. For example, a highly accurate mirror having a face-to-axis of rotation tolerance of $2.4 \times 10^{-5}$ radian (5 seconds of arc) is difficult to manufacture and is expensive, but would be necessary to maintain a desired accuracy of within 5 percent spot motion perpendicular to the scan direction. Such accuracy is often necessary for high speed high resolution scan applications.

OBJECTS

Thus, the objects of this invention include providing:
1. An economical means for minimizing spot motion from successive facets perpendicular to the scan direction;
2. The economical means above by eliminating the need for highly accurate rotating mirrors in a rotating mirror scan system;
3. The economical scanning system above by utilizing inexpensive cylindrical or toroidal lenses in such a manner as to allow the use of increased tolerance rotating mirrors in such a scan system;
4. A scan system as in (3) above wherein such rotating mirrors may specifically have increased nominal axis of rotation to face or nominal axis of rotation to facet tolerances.
5. A printer system utilizing the scanning system above for economical printing applications.

SUMMARY OF THE INVENTION

These and other objects are met by the apparatus of this invention. In the plane perpendicular to the scan, the first cylindrical lens forms a line image on the mirror face. The combination of the second cylindrical or toroidal lens and the spherical lens together geometrically image the line image on the mirror as a point on the final image plane. Since the final image is a geometrical image of the line image on the mirror, the angular variation of the various facets with the nominal axis of rotation does not alter the geometrical image position in the direction perpendicular to the scan.

In one preferred embodiment, the light scanning system comprises a light means such as a laser directed through a light modulation means as known in the art toward a first focusing means comprising a cylindrical lens. The cylindrical lens, by definition having a major and minor axis of different power, focuses the light beam coming from the light means to a line image parallel to the major axis of the cylindrical lens upon a reflecting means such as a reflecting mirror. A beam configuring means in the form of a similar cylindrical or toroidal lens reconfigures the beam into a substantially collimcated shape directed toward a second focusing means for focusing the light from the beam configuring means to an image upon an image plane. The relecting means is aligned with its axis of rotation orthogonal to the plane formed by the incoming and reflected beam. In this manner, inexpensive cylindrical or toroidal lenses may be utilized with an inexpensive non-high tolerance rotating mirror to achieve a desired degree of spot motion in the plane perpendicular to the direction of scan.

Another advantageous embodiment is as a low cost laser printer.

These and other embodiments will best be understood in light of the following drawings and general description.

IN THE DRAWINGS

GENERAL DESCRIPTION

Figure 1:
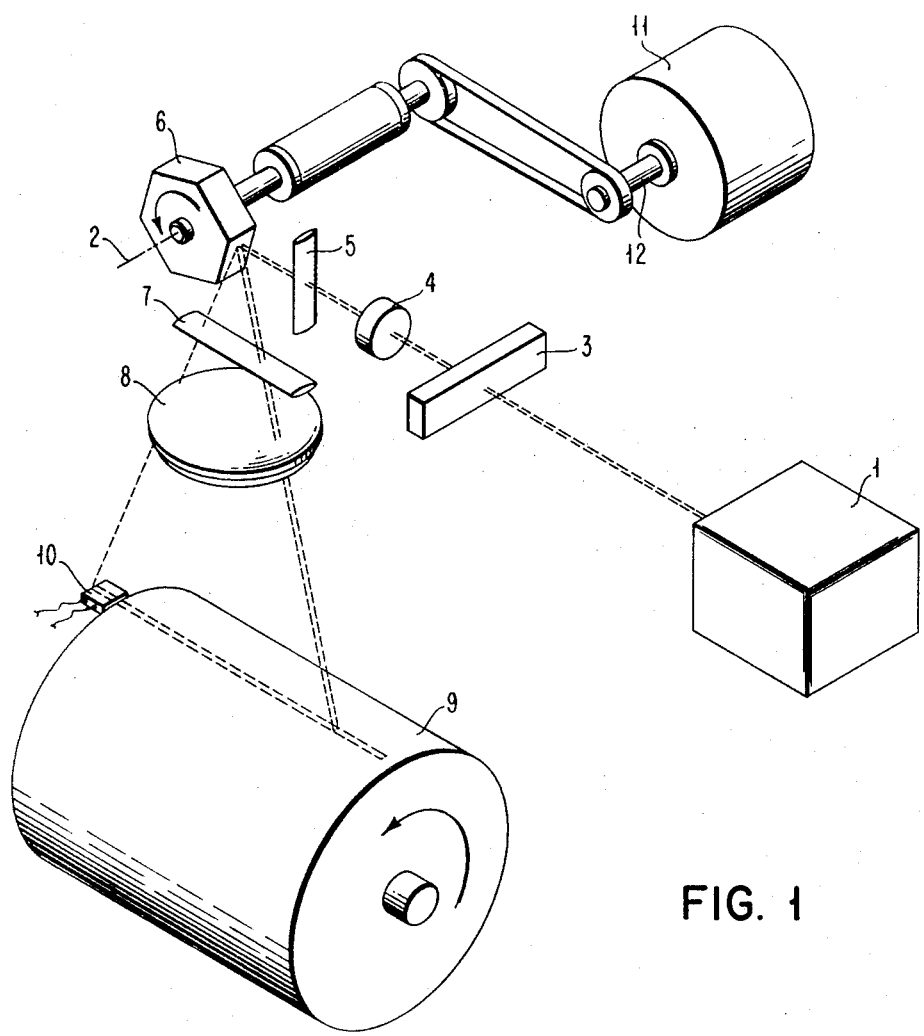
FIG. 1 shows a general optical configuration of the apparatus of this invention showing the alignment of the light means, a pair of cylindrical lenses, a rotating mirror and the image plane.

FIG. 1 shows the general configuration of the apparatus of this invention. A light means 1 such as a low powered laser produces a beam of coherent light which is incident upon a modulator means 3. This modulator means may be any one of a number of well known modulator means, such as an electro-optical modulator, acousto-optical modulator, or other modulator means known in the art. A beam expander 4 may also be utilized, if desired, to control the dimension of the beam to a more optimum diameter. The beam is next directed toward cylindrical lens 5 which focuses the beam in one dimension onto a rotating polygon 6, commonly a rotating mirror. The rotating mirror causes the beam to be deflected, as shown. A second cylindrical lens 7 reconfigures the beam to an approximately circular cross-section. The beam is then focused by another lens 8, typically a spherical lens onto an image plane 9. The image plane can be ground glass, a viewing screen, a photosensitive material, or other well known image plane viewing or receiving devices.

In one embodiment, a flat plate image plane may be utilized, as for display purposes. In the embodiment shown, a rotating photoconductive coated drum 9 is utilized, as for a printer application, discussed below.

As shown in the example of FIG. 1, cylindrical lenses 5,7 are related to the reflecting means 6 so that the reflecting means 6 is aligned with its reflection normal in the plane formed by the incoming and reflected beam. The reflection normal is the normal to the plane mirror face. The first cylindrical lens 5 is located at its focal length from the mirror 6 to allow focusing in the form of a line image parallel to the major axis of the cylindrical lens upon the mirror face. The major axis of the cylindrical lens is parallel to the axes of the cylindrical surface of the lens. By definition, the minor axis would be perpendicular to that. Further, if the first focusing means 5 is defined as having a major and a minor axis each of a different power, for focusing upon a reflecting means the incoming light beam from source 1 to a line image parallel to the major axis of the first focusing means on the reflecting means 6, then this definition will also include a toroidal lens as well. Cylindrical lens 7 may then also be a toroidal lens. A combination of cylindrical and toroidal lens is also permissible.

The use of the two cylindrical lenses 5 and 7 permits the tolerance of the dynamic parallelism of the rotating polygon to be orders of magnitude less demanding than would otherwise by required to achieve the beam position tolerance on the image plane 9 to within for example ±0.0005 inch. This system of lenses also provides an easy method for producing an elliptically shaped incident beam for the image plane. By having the major axis of the elliptical beam perpendicular to the plane of the deflected beam, a good adjacent line scan abutment is achieved while maintaining the capability of high spatial frequency response in the plane of the scan.

Figure 2:
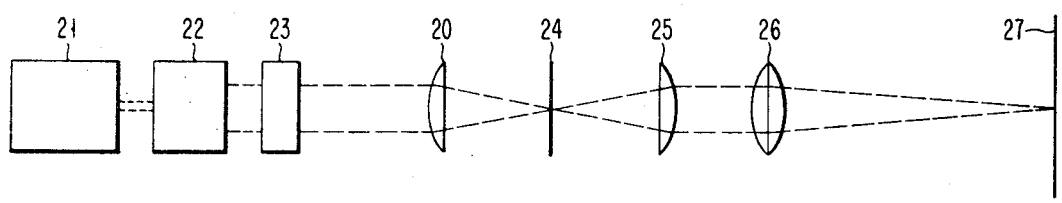
FIG. 2 illustrates the unfolded optical path of the apparatus of FIG. 1.

FIG. 2 illustrates the operation of the two cylindrical and in focusing the beam in one dimension onto the rotating mirror and then recollimating. An unfolded optical path is shown. The first cylindrical element 20 focuses the beam from light source 21 shown for convenience going through beam expander 22 and modulator 23 in one dimension onto the rotating mirror 24, and recollimating via cylindrical lens 25. Spherical lens 26 focuses the recollimated beam onto image plane 27. Thus the first cylindrical element focuses the beam on the rotating mirror 24 and forms a slit image parallel to the plane of rotation. The second cylindrical element 25 collects the light and recollimates the beam for receipt by the final spherical imaging lens 26.

Figure 4:
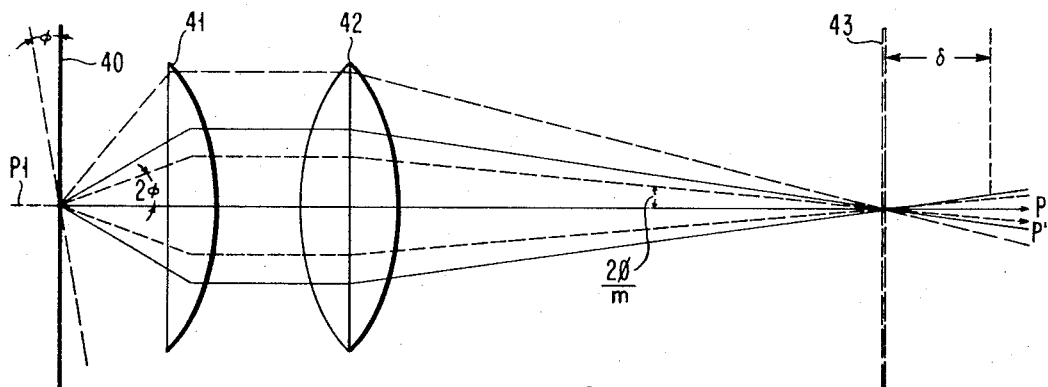
FIG. 4 shows the effect of the use of the cylindrical lenses in conjunction with the spherical lens to maintain the focus and spot motion control in the image plane.

By focusing the beam on the mirror, the collimated beam incident on the spherical imaging lens is very insensitive to changes in the face-to-axis of rotation angle $\phi$, as shown in FIG. 4. As long as the angle $\phi$ in FIG. 4 is small enough that the beam does not miss the aperture of the cylindrical lens, the beam will be collimated and incident normally upon the spherical lens.

The limiting factor on the angular tolerance is the fact that the principal ray makes an angle with the optical axis after leaving the spherical lens and the spherical lens unless properly corrected will have some field curvature. An additional constraint is that for rotating mirrors, the desired angular rotation to produce the scan takes place generally not at the mirror face. As a consequence, the mirror moves in and out of focus thus producing a defocusing of the final image. This is minimized by designing the cylindrical and toroidal numerical apertures so that the mirror motion is less than their depth of focus.

Figure 3:
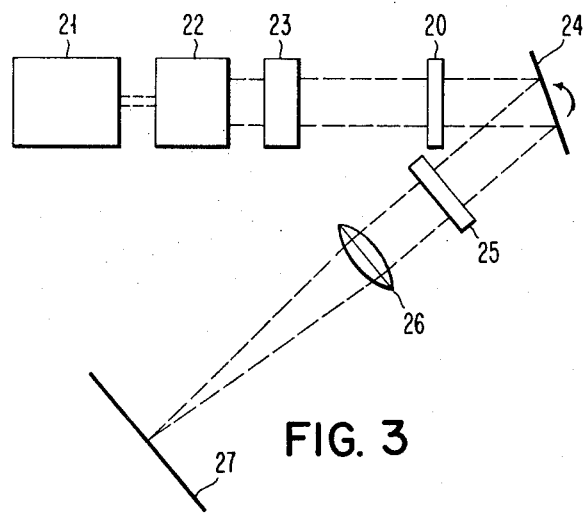
FIG. 3 shows a top view of a partially folded light path of the FIG. 2 apparatus.

A top view of the system of FIG. 2 is illustrated in FIG. 3.

FIG. 4 is illustrative of the general principles involved. FIG. 4 shows rotating mirror face 40, cylindrical lens 41, spherical lens 42 and image plane 43. For example, when the rotating mirror 40 is tilted by an angle $\phi$ the principal ray P1 in the image space makes an angle $2\phi/m$ with the optical axis. This results in a vertical displacement of the spot as the horizontal scan angle is increased. As specifically illustrated then by one example, the curved field due to a spherical single element having a focal length = 15" and index =1.5 has a radius $$r = f \cdot n = (15")(1.5) = 22.5"$$

The sag due to this radius at $y = 4.25"$ is $$sag = y^2/2r = [(4.25)^2/2(22.5)](25.4) = 10.2 \text{ mm}$$

The vertical spot motion at the edge of the field due to the inclination of the principal ray is:

$$D = 10.2 \text{ mm tan } (20')/7.5$$

where tan 20' = twice the mirror tolerance of 10',
and 7.5 is the ratio of spherical to cylindrical focal lengths = $m$ $$D = 0.31 \text{ mils}$$

The spot is in focus over this curved field since the depth of focus is:

$$\delta = \pm 2\lambda (f/\#)^2 = \pm 2 (0.6328\mu)(200)^2 \approx 50 \text{ mm}$$

The use of a toroidal element after reflection from the mirror reduces the effects of power change with angle of incidence for a cylindrical lens. That is, at normal incidence on a cylindrical element, thepower is Pa. As the angle of incidence is increased in the scan plane, thepower of the cylinder is altered. A toroidal element eliminates, or reduces, this effect.

A system not incorporating the cylindrical elements above would require a face-to-axis of rotation tolerance of 2.4 × $10^{-5}$ radians (5 seconds of an arc) in order to maintain a vertical spot motion of ± five percent of one 10 mil spot diameter, for example. Using cylindrical lenses of focal length 50 mm and a spherical lens of focal length 15 inches, the angular tolerance can be increased to 2.9 × $10^{-3}$ radians (10 minutes of arc). A mirror of tolerance of 5 minutes of arc is readily obtainable and can maintain five percent spot motion. Thus, this represents a tolerance more than 50 times the initial value and considerably more practical to work with. It also allows the tolerance to be distributed as desired between the optical parallelism of the faces and the bearing runout of the rotating shaft 12 of FIG. 1. A cost estimate of mirrors fabricated with each of the two tolerances are different by a minimum of a factor of 10.

Referring to FIG. 1, the rotating polygon 6 is driven by a constant speed motor 11. The speed of rotation is established by selecting a proper pulley ratio. Without the cylindrical lenses 5,7, the motor must be an integral part of the polygon spindle to achieve the tight dynamic parallelism tolerance. As the motor is then a part of the spindle, its speed is not easily corresponded to a submultiple of the line frequency, e.g. 3,600 RPM, 1,800 RPM, etc., which is easy to maintain, but rather a special power source or controller is necessary to provide the correct speed. However, by utilizing the cylindrical lenses above in the manner shown, the need for a built-in motor and speed controller is eliminated. Thus, further cost saving is possible.

A photosensor 10 may be located on the image plane to detect the time at which the beam begins to scan the image plane. A timing pulse may be utilized to start the flow of data which drives the modulator means 3. Control of the scan motion is well known in the art by a number of well known ways.

An advantageous embodiment of the scanning system described is within a laser printing system. Referring again to FIG. 1, a laser printing system comprises a laser 1, such as a He-Ne laser, directed toward modulator means 3. Modulator means 3 is controlled for example by a computer input, not shown, which determines the exposure on an electrophotographic surface such as a photoconductive drum 9 in for example, a dot matrix pattern. The balance of the system is described previously.

Photoconductive drum 9 may have the image upon it developed by use of toner, and the toned image transferred to hard copy and fused, as is well known in the electrophotographic arts.

Thus, by use of the cylindrical lenses in the manner shown, a low cost scanning and also printing system has been devised allowing the use of inexpensive mirrors while maintaining a tight vertical spot motion perpendicular to the plane of scan.

It will be appreciated that cylindrical or toroidal lenses may be used in conjunction with a variety of modulator means 3. Modulator means controlled by electronic circuits for different types of scans is well known in the art. The light source may be coherent or incoherent, monochromatic or multiwavelength. Various types of beam expanders and mirrors are available, as well as mirror means. The invention of course lies in the use of cylindrical or toroidal lenses aligned with the rotating reflecting means in the manner shown, and also as applied to the low cost printer disclosed.

What I claim is:

1. A light scanning system of controlled spot motion variation perpendicular to the direction of scan comprising:
    light means for generating a light beam;
    first focusing means having a major and a minor axis each of a different power for focusing upon a reflecting means the incoming light beam from the light means to a line image parallel to the major axis of the first focusing means;
    beam configuring means having a major and a minor axis each of a different power to configure the light beam reflected from the reflecting means to substantially collimated shape, the reflecting means being aligned with its reflection normal in the plane formed by the incoming and reflected beam; and
    second focusing means for focusing the light beam from the beam configuring means to an image on an image surface;
    whereby a distinct parallel line scan is achievable while allowing increased reflecting means tolerances of angle between nominal axis of rotation and reflecting surface.

2. The apparatus of claim 1 wherein the reflecting means is a rotating mirror.

3 The apparatus of claim 1 wherein the first focusing means is a cylindrical lens.

4. The apparatus of claim 1 wherein the beam configuring means is a cylindrical lens.

5. The apparatus of claim 1 wherein the second focusing means is a spherical lens.

6. The apparatus of claim 1 wherein a photosensitive material is located at the image plane.

7. The apparatus of claim 1 wherein the light means includes light modulator means for modulating the light beam incident to the first focusing means.

8. The apparatus of claim 1 wherein the first focusing means is a toroidal lens.

9. The apparatus of claim 1 wherein the beam configuring means is a toroidal lens.

10. A laser printer comprising:
    laser light means for generating a light beam directed toward a modulator means for modulating the light beam intensity;
    first focusing means having a major and a minor axis each of a different power for focusing upon a reflecting means the incoming light beam from the modulator means to a line image parallel to the major axis of the first focusing means;
    beam configuring means having a major and a minor axis each of a different power to configure the light beam reflected from the reflecting means to substantially collimated shape, the reflecting means being aligned with its reflection normal in the plane formed by the incoming and reflected beam; and
    second focusing means for focusing the light beam from the beam configuring means to an image on an electrophotographic surface;
    whereby a distinct parallel line printing is achievable while allowing increased reflecting means tolerances of angle between nominal axis of rotation and reflecting surface.

11. The apparatus of claim 10 wherein the reflecting means is a rotating mirror.

12. The apparatus of claim 10 wherein the first focusing means is a cylindrical lens.

13. The apparatus of claim 10 wherein the beam configuring means is a cylindrical lens.

14. The apparatus of claim 10 wherein the second focusing means is a spherical lens.

15. The apparatus of claim 10 wherein a photosensitive material is located at the image plane.

16. The apparatus of claim 10 wherein the light means includes light modulator means for modulating the light beam incident to the first focusing means.

17. The apparatus of claim 10 wherein the first focusing means is a toroidal lens.

18. The apparatus of claim 10 wherein the beam configuring means is a toroidal lens.

19. The printer of claim 10 wherein the electrophotographic surface is a photoconductive surfaced drum configuration.

20. The printer of claim 10 wherein the modulator means modulates the light beam intensity.

21. The printer of claim 19 wherein the modulator means modulates the beam to expose the photoconductive surface in a dot matrix pattern.

* * * * *

PO-1050
(5/69)

UNITED STATES PATENT OFFICE
CERTIFICATE OF CORRECTION

Patent No. __3,750,189__  Dated __July 31, 1973__

Inventor(s) __JOHN M. FLEISCHER__

It is certified that error appears in the above-identified patent and that said Letters Patent are hereby corrected as shown below:

In Col. 6, Claim 10, line 24, delete the word "intensity".

Signed and sealed this 19th day of March 1974.

(SEAL)
Attest:

EDWARD M. FLETCHER, JR.
Attesting Officer

C. MARSHALL DANN
Commissioner of Patents